(12) United States Patent
Brault et al.

(10) Patent No.: US 7,197,958 B2
(45) Date of Patent: Apr. 3, 2007

(54) ENERGY STORAGE FLYWHEEL RETENTION SYSTEM AND METHOD

(75) Inventors: Sharon K. Brault, Chandler, AZ (US); Paul T. Wingett, Mesa, AZ (US); Calvin C. Potter, Mesa, AZ (US)

(73) Assignee: Honeywell International, Inc., Morristown, NJ (US)

(*) Notice: Subject to any disclaimer, the term of this patent is extended or adjusted under 35 U.S.C. 154(b) by 616 days.

(21) Appl. No.: 10/650,267

(22) Filed: Aug. 27, 2003

(65) Prior Publication Data

US 2005/0061920 A1  Mar. 24, 2005

(51) Int. Cl.
*G01G 19/24* (2006.01)
*F16C 13/02* (2006.01)

(52) U.S. Cl. .......................... 74/572.2; 74/5.1

(58) Field of Classification Search .............. 74/572.1, 74/572.2, 572.21, 5.1; 310/90.5; 244/165
See application file for complete search history.

(56) References Cited

U.S. PATENT DOCUMENTS

| | | | |
|---|---|---|---|
| 2,556,253 A | 6/1951 | Blair et al. | |
| 2,732,719 A | 1/1956 | Watson | |
| 2,786,356 A | 3/1957 | Klose | |
| 2,884,787 A | 5/1959 | Simons | |
| 3,114,269 A | 12/1963 | Mills | |
| 3,142,184 A | 7/1964 | East et al. | |
| 3,430,499 A | 3/1969 | Craig | |
| 3,477,297 A | 11/1969 | Howe | |
| 3,589,485 A * | 6/1971 | Kajitani et al. ........... 192/18 B |
| 3,596,523 A | 8/1971 | Clark | |
| 3,677,098 A | 7/1972 | Davis | |
| 3,898,889 A | 8/1975 | Bickman | |
| 3,910,211 A * | 10/1975 | Kubokura ................... 112/275 |
| 4,155,521 A | 5/1979 | Evans et al. | |
| 4,172,985 A * | 10/1979 | Meier .......................... 310/74 |
| 4,322,984 A | 4/1982 | Lasker et al. | |
| 4,345,485 A | 8/1982 | Livet et al. | |
| 4,533,021 A * | 8/1985 | Perez de la Orden ...... 187/290 |
| 4,654,492 A * | 3/1987 | Koerner et al. ............. 200/564 |
| 4,823,926 A * | 4/1989 | Wittler et al. ............. 192/18 B |
| 4,872,357 A * | 10/1989 | Vaillant De Guelis et al. 74/5.1 |
| 5,419,212 A * | 5/1995 | Smith ........................... 74/5.1 |
| 5,628,267 A * | 5/1997 | Hoshio et al. .............. 114/122 |
| 6,006,871 A * | 12/1999 | Leconte et al. ............ 188/72.4 |
| 6,598,492 B1 | 7/2003 | Corzilius | |
| 6,603,230 B1 | 8/2003 | Abel | |
| 6,630,761 B1 * | 10/2003 | Gabrys ....................... 310/90.5 |
| 6,750,588 B1 * | 6/2004 | Gabrys ....................... 310/268 |
| 6,897,587 B1 * | 5/2005 | McMullen et al. ........ 310/90.5 |
| 6,923,090 B2 * | 8/2005 | Blonski et al. ............... 74/436 |
| 6,964,311 B2 * | 11/2005 | Yang ......................... 180/65.1 |

* cited by examiner

Primary Examiner—Chong H. Kim
(74) Attorney, Agent, or Firm—Ingrassia Fisher & Lorenz

(57) ABSTRACT

An energy storage flywheel system includes a flywheel assembly that is rotationally mounted in a housing assembly, and one or more actuator assemblies. The actuator assemblies are configured to selectively engage and disengage the flywheel assembly. When the actuator assemblies engage the flywheel assembly, the actuator assemblies provide support for, and inhibit rotation of, the flywheel assembly. When the actuator assemblies disengage the flywheel assembly, the actuator assemblies no longer support the flywheel assembly, and no longer inhibit its rotation.

18 Claims, 2 Drawing Sheets

US 7,197,958 B2

ENERGY STORAGE FLYWHEEL RETENTION SYSTEM AND METHOD

TECHNICAL FIELD

The present invention relates to energy storage flywheel systems and, more particularly, to a system and method of providing support for, and/or inhibiting rotation of, an energy storage flywheel when the flywheel system is being transported and/or launched.

BACKGROUND

Many satellites and other spacecraft, as well as some terrestrial stationary and vehicle applications, such as sea-going vessels, can include one or more energy storage flywheel systems to provide both a backup power source and to provide attitude control for the vehicle. In such systems, each flywheel system is controlled and regulated to balance the electrical demand in the vehicle electrical distribution system, and may also be controlled in response to programmed or remote attitude (or torque) commands received by a main controller in the vehicle.

Many energy storage flywheel systems include one or more components that are rotationally mounted within a housing assembly. These components, which may be referred to as the rotating group, include, for example, an energy storage flywheel, a motor/generator, and a shaft. In particular, the energy storage flywheel and motor/generator may be mounted on the shaft, which may in turn be rotationally mounted in the housing assembly via one or more bearing assemblies. In many instances, the shaft is rotationally mounted using one or more primary bearing assemblies, and one or more secondary, or back-up, bearing assemblies. For example, in many satellite and spacecraft applications, the flywheel system may include one or more magnetic bearing assemblies that function as the primary bearing assemblies, and one or more mechanical bearing assemblies that function as the secondary bearing assemblies.

When a flywheel system is being transported from one location to another for testing and/or installation into an end-use system, the magnetic bearing assemblies are not activated and, therefore, will not support the rotating group. Moreover, when a flywheel system is installed in a satellite or other spacecraft, the magnetic bearing assemblies are not activated during the launch of the satellite or spacecraft. Thus, the magnetic bearings will also not provide support to the rotating group under these conditions.

During both of the operational events described above (e.g., transport and launch), the flywheel system may be subjected to various forces and vibrations. However, in many instances the secondary bearings are not constructed or configured to adequately support the rotating group against the vibrations and forces the flywheel system may experience during these events. As a result, the rotating group can be damaged during these operational events, which can shorten the effective life of the flywheel system and/or can increase system costs. To reduce the likelihood for damage during transport from one earthbound site to another for testing and/or installation, a flywheel system may be partially disassembled before transport, and then reassembled upon arrival at it destination. This operation can be time-consuming, and can undesirably add to overall system costs.

Hence, there is a need for a system and method for supporting the rotating group in an energy storage flywheel system during flywheel system transportation and/or launch that addresses one or more of the above-noted drawbacks. Namely, a system and method that supports the rotating group during transport and/or launch that reduces the likelihood for damage to the rotating group and/or does not rely on partial system disassembly and reassembly and/or reduces overall system costs. The present invention addresses one or more of these drawbacks.

BRIEF SUMMARY

The present invention provides a system and method for supporting the rotating group in an energy storage flywheel system during flywheel system transportation and/or launch.

In one embodiment, and by way of example only, an energy storage flywheel system includes a housing assembly, a flywheel assembly, and one or more actuator assemblies. The flywheel assembly is rotationally mounted in the housing assembly. Each actuator assembly is mounted in the housing assembly, and is configured to selectively (i) engage the flywheel assembly, to thereby inhibit movement thereof, and (ii) disengage the flywheel assembly, to thereby allow movement thereof.

In another exemplary embodiment, an energy storage flywheel system includes a housing assembly, a flywheel assembly, one or more magnetic bearing assemblies, one or more actuator assemblies, and a control circuit. The flywheel assembly is rotationally mounted in the housing assembly. Each magnetic bearing assembly is mounted in the housing assembly and is adapted to receive (i) an activation command, whereby the magnetic bearing assembly rotationally mounts the shaft in non-contact manner or (ii) an inactivation command, whereby the magnetic bearing assembly does not rotationally mount the shaft. Each actuator assembly is mounted in the housing assembly and is adapted to receive (i) an engage signal, whereby the actuator engages the flywheel against movement or (ii) a disengage signal, whereby the actuator disengages the flywheel assembly. The control circuit is configured to (i) supply the engage signal to each actuator assembly when the inactivation command is supplied to the magnetic bearing assembly and (ii) supply the disengage signal to each actuator assembly when the activation command is supplied to the magnetic bearing assembly.

In yet another exemplary embodiment, a method of selectively inhibiting rotation of a rotationally mounted flywheel assembly includes engaging at least a portion of the flywheel assembly, to thereby substantially inhibit movement thereof, and disengaging the flywheel assembly, to thereby allow movement thereof.

Other independent features and advantages of the preferred flywheel caging system will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
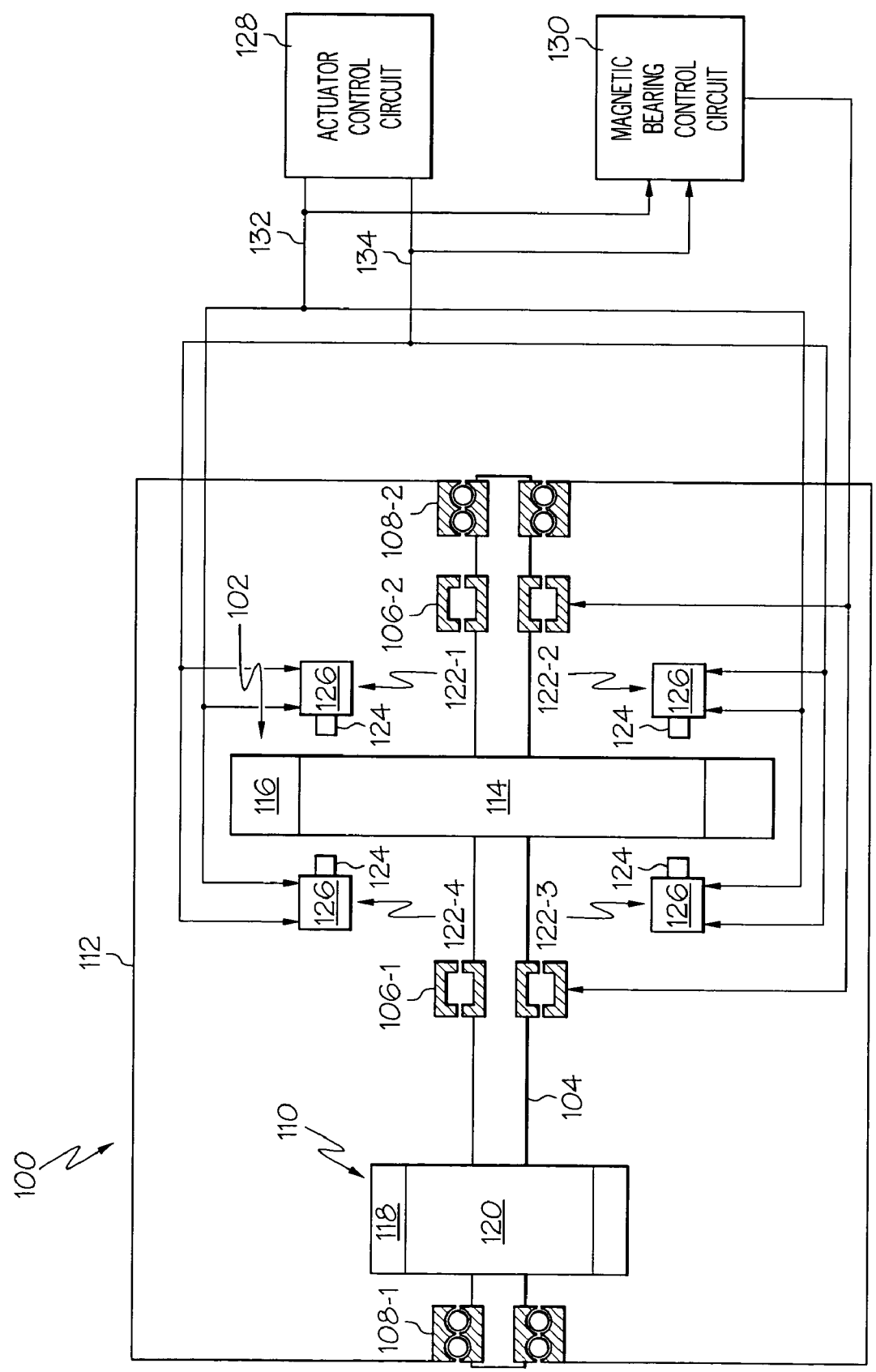
FIG. 1 is a simplified schematic representation of an exemplary energy storage flywheel system that includes an exemplary embodiment of a retention system in a disengaged configuration.

A simplified schematic representation of an energy storage flywheel system 100 is depicted in FIG. 1. In the depicted embodiment, the energy storage flywheel system 100 includes a flywheel assembly 102, a shaft assembly 104, a plurality of primary bearing assemblies 106, a plurality of secondary bearing assemblies 108, and a motor/generator 110, all of which are preferably mounted within a housing assembly 112. It will be appreciated that the internal portion of the housing assembly 112, during operation of the system 100, may be placed at a vacuum to minimize aerodynamic losses. It will additionally be appreciated that if the energy storage flywheel system 100 is installed in a natural vacuum environment, such as in space applications, then the housing assembly 112 internals need not be at a vacuum.

The flywheel assembly 102 may be constructed in any one of numerous configurations and of any one of numerous materials. In the depicted embodiment, the flywheel 102 includes a hub 114 and a flywheel rim 116. The hub 114 is preferably constructed of a high-strength metal alloy, and is mounted on the shaft assembly 104. The hub 114 may be constructed in any one of numerous configurations including, for example, a solid configuration, a spoke-type configuration, or a combination thereof. The flywheel rim 116 is mounted on, and surrounds the hub 114, and is preferably constructed of a material having a high strength-to-density ratio such as, for example, filament wound carbon fiber.

The shaft assembly 104 is rotationally supported in the housing assembly 112. The rotational support for the shaft 104 is provided by either the primary magnetic bearing assemblies 106, when activated, or the secondary bearing mechanical assemblies 108, when the primary magnetic bearing assemblies 106 are deactivated or not operating for one reason or another. In the depicted embodiment, the primary magnetic bearing assemblies 106 are active magnetic bearing assemblies, and the secondary bearing assemblies 108 are mechanical, roller ball type bearing assemblies, and each are positioned on either side of the flywheel assembly 102. In particular, with respect to the view depicted in FIG. 1, a first magnetic bearing assembly 106-1 and a first mechanical bearing assembly 108-1 are each positioned to the left of the flywheel assembly 102, and a second magnetic bearing 106-2 and a second mechanical bearing assembly 108-2 are each positioned to the right of the flywheel assembly 102. It will be appreciated that the number and type of primary 106 and secondary 108 bearing assemblies may be varied and that two of each is merely exemplary of a particular preferred embodiment.

The motor/generator 110 is coupled to the shaft assembly 104, and includes a stator assembly 118 and a rotor assembly 120. The motor/generator 110 is configured to operate in either a motor mode or a generate mode. When operating in the motor mode, electrical energy is supplied to the motor/generator stator assembly 118 and, via normal motor action, the supplied electrical energy is converted to mechanical energy in the motor/generator rotor 110, which in turn rotates the shaft assembly 104 and thus the flywheel assembly 102. Conversely, when it is operating in the generate mode, mechanical energy stored in the flywheel assembly 102 is supplied to the shaft assembly 104, which is in turn supplied to the motor/generator rotor assembly 110. This mechanical energy is converted to electrical energy in the motor/generator stator assembly 118, via normal generator action, and is supplied external to the energy storage flywheel system 100. It is to be appreciated that the motor/generator stator 118 and rotor 120 assemblies may be any one of numerous stator and rotor assembly designs known in the art for performing their intended functions. An understanding of the structure of the motor/generator stator 118 and rotor 120 assemblies is not necessary to an understanding of the present invention and, therefore, will not be further described.

Figure 2:
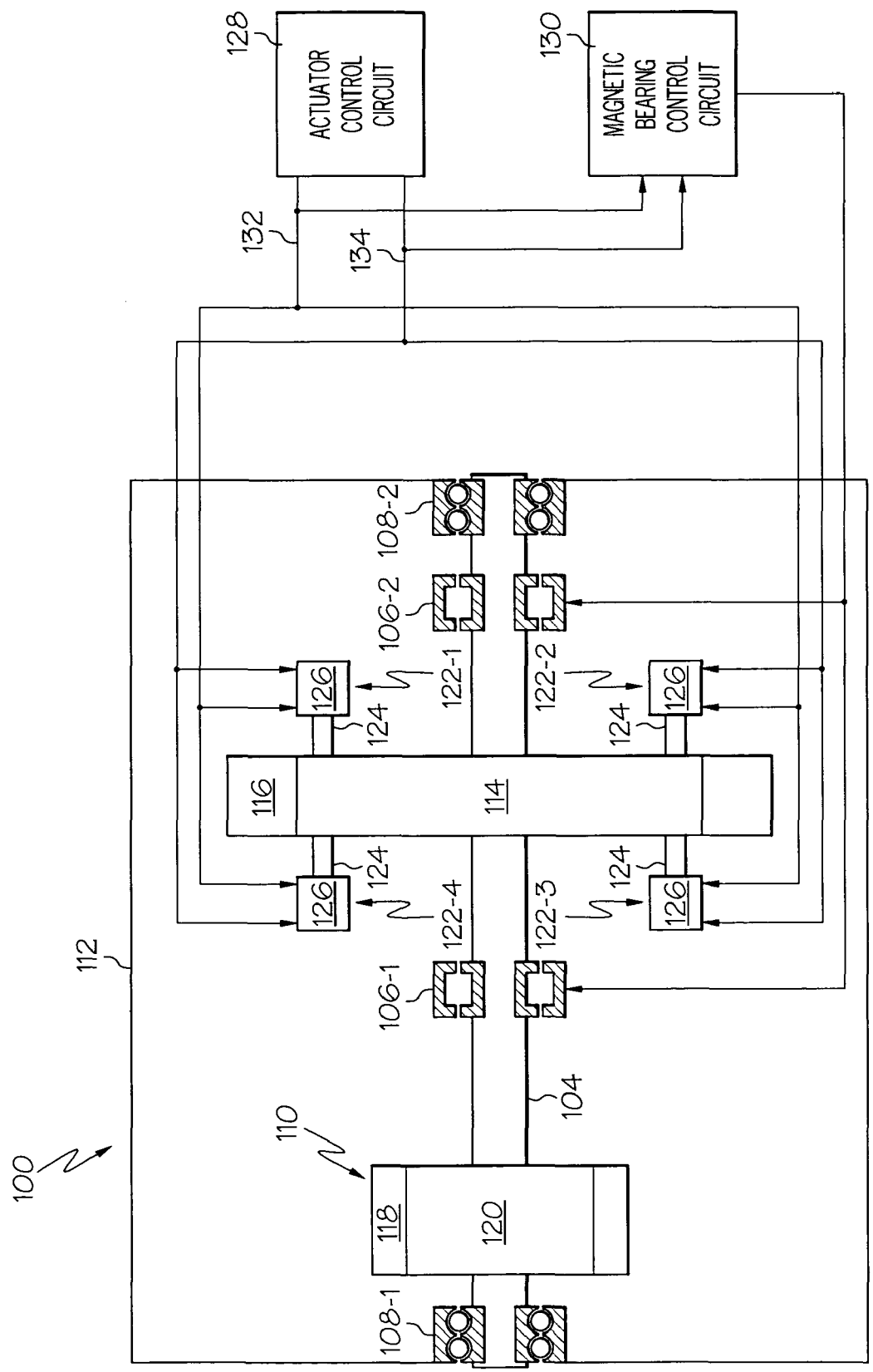
FIG. 2 is a simplified schematic representation of the system shown in FIG. 1, but with the exemplary retention system in an engaged configuration.

In addition to the above-described components, the energy storage flywheel system 100 includes a plurality of flywheel assembly latch actuator assemblies 122. In the depicted embodiment, four latch actuator assemblies 122 are mounted in the housing assembly 112, with two of the actuator assemblies 122-1, 122-2 being positioned above the flywheel assembly 102, and the other two actuator assemblies 122-3, 122-4 being positioned below the flywheel assembly 102. Preferably, the actuator assemblies 122 are aligned with the flywheel assembly hub 114, and even more particularly, with an outer portion of the hub 114. The actuator assemblies 122 are selectively movable between an engaged position and a disengaged position. In the engaged position, which is shown in FIG. 2, the actuator assemblies 122 engage the flywheel assembly hub 114, and provide support to, and inhibit movement of, the flywheel assembly 102. In the disengaged position, which is the position shown in FIG. 1, the actuator assemblies 122 are disengaged from the flywheel assembly hub 114. Thus, the actuator assemblies 122 provide no support for the flywheel assembly 102, and flywheel assembly movement is not inhibited. It will be appreciated that the movement of the flywheel assembly 102 that the actuator assemblies 122 inhibit both rotational and translational movement.

The actuator assemblies 122 may be any one of numerous types of actuator assemblies 122 including, but not limited to, motor-driven jackscrews, motor-driven pistons, and various types of solenoids. In a particular preferred embodiment, however, the actuator assemblies 122 are solenoid-operated actuators, that each includes an actuator 124 and a solenoid 126. The actuators 124 may be any one of numerous actuator types and any one of numerous actuator configurations that will appropriately engage the flywheel assembly 102, to support the flywheel assembly 102 and inhibit its rotation The solenoids 126 may additionally be any one of numerous solenoid types and configurations. However, in a preferred embodiment, the solenoids 126 are latch-type solenoids. As is generally known, a latch-type solenoid is moved from one position to another by supplying it with one or more electrical signals of appropriate polarity. Once the latch-type solenoid is moved to the desired position, it will remain latched in that position until it is supplied with one or more electrical signals of the opposite polarity. At that time, it will overcome the latching force and move to the opposite position.

As FIGS. 1 and 2 also show, the energy storage flywheel system 100 additionally includes one or more control circuits. In the depicted embodiment, the system includes an actuator assembly control circuit 128 and a magnetic bearing control circuit 130. The actuator assembly control circuit 128 is coupled to each of the actuator assemblies 122, and is configured to supply the appropriate electrical signals (e.g., an actuator engage command signal 132 and an actuator disengage command signal 134) to the actuator assemblies 122, to thereby move each between the engaged and disengaged positions. The actuator control circuit 128 is also in operable communication with the magnetic bearing control circuit 130, and supplies the actuator engage 132 and disengage 134 command signals to the magnetic bearing control circuit 130.

The magnetic bearing control circuit 130 receives the actuator engage 132 and disengage 134 commands and, in response, is operable to either activate and control the magnetic bearing assemblies 106, or to deactivate and shutdown the magnetic bearing assemblies 106. In particular, when the actuator assembly control circuit 128 supplies the engage command signal 132 to the actuator assemblies 122, the magnetic bearing controller 130 will shutdown and deactivate the magnetic bearings 106. Conversely, when the actuator assembly control circuit 128 supplies the disengage command signal 134 to the actuator assemblies 122, the magnetic bearing controller will activate and control the magnetic bearing assemblies 106 in accordance with an appropriate control law. This synchronization of the activation and deactivation of the magnetic bearing assemblies 106 with the disengagement and engagement of the actuator assemblies 122, respectively, will ensure that the flywheel assembly 102 is properly supported and its movement is appropriately inhibited whenever the magnetic bearing assemblies are deactivated.

It will be appreciated that the control circuit configuration depicted in FIGS. 1 and 2 and described above is merely exemplary of one particular embodiment, and that other control circuit configurations could also be used. For example, rather than the magnetic bearing control circuit 130 responding to signals from the actuator control circuit 128, the opposite configuration could be implemented. Specifically, the magnetic bearing control circuit 130 could supply one or more signals to the actuator control circuit 128. In response to the signals from the control circuit 130, the actuator control circuit 128 would supply the engage 132 and disengage 134 command signals to the actuators 122. It will additionally be appreciated that the actuator control circuit 128 and the magnetic bearing control circuit 130 could be integrally formed. In yet another alternative and non-limiting configuration, each control circuit 128, 130 could be configured to receive one or more command signals from a main controller (not shown). In response to the command signals, the actuator control circuit 128 would supply the engage and disengage command signals to the actuator assemblies 122, and the magnetic bearing control circuit 130 would activate and deactivate the magnetic bearing assemblies 106.

The energy storage flywheel system and method described herein includes one or more actuators that provide support for, and inhibit rotation of, a flywheel assembly 102 that is rotationally mounted using one or more magnetic bearing assemblies, whenever the magnetic bearing assemblies are deactivated, such as during flywheel system shipment, or during a vehicle launch when the flywheel system is installed in a spacecraft. The support and rotation prevention provided by the actuators reduces the likelihood of damage occurring to the flywheel system rotating group, and alleviates any partial system disassembly and reassembly before and after shipment.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel system, comprising:
    a housing assembly;
    a flywheel assembly rotationally mounted in the housing assembly;
    one or more magnetic bearing assemblies mounted in the housing assembly, each magnetic bearing assembly selectively activatable and deactivatable, and when activated, rotationally mounts the flywheel assembly in non-contact manner; and
    one or more actuator assemblies mounted in the housing assembly, each actuator assembly selectively (i) engaging the flywheel assembly, to thereby inhibit at least rotational movement thereof when each of the magnetic bearing assemblies is deactivated, and (ii) disengaging the flywheel assembly, to thereby allow at least rotational movement thereof when each of the magnetic bearing assemblies is activated.

2. The system of claim 1, further comprising:
    a control circuit to selectively supply an engage signal and a disengage signal,
    wherein each actuator assembly is coupled to receive the engage and disengage signals from the control circuit and, in response thereto, engages and disengages the flywheel assembly, respectively.

3. The system of claim 1, further comprising:
    a control circuit to selectively supply an engage signal when the magnetic bearing assembly is deactivated, and a disengage signal when the magnetic bearing, assembly is activated,
    wherein each actuator assembly is coupled to receive the engage and disengage signals from the control circuit and, in response thereto, engages and disengages the flywheel assembly, respectively.

4. The system of claim 3, wherein each actuator assembly comprises:
    a solenoid coupled to receive the engage and disengage signals from the actuator assembly control circuit and, in response thereto, moves in an engage and disengage direction, respectively; and
    an actuator coupled to the solenoid to (i) engage the flywheel assembly when the solenoid moves in the engage direction and (ii) disengage the flywheel assembly when the solenoid moves in the disengage direction.

5. The system of claim 4, wherein each solenoid is a latch solenoid.

6. The system of claim 1, further comprising:
    one or more mechanical bearing assemblies mounted in the housing assembly, each mechanical bearing assembly coupled to the flywheel assembly to rotationally mount the flywheel assembly at least when each of the magnetic bearing assemblies is deactivated.

7. The system of claim 1, further comprising:
    a magnetic bearing control circuit to receive bearing command signals and, in response thereto, to supply at least the activation and deactivation signals to each of the magnetic bearings.

8. The system of claim 1, wherein the flywheel assembly comprises:
a shaft;
a flywheel hub coupled to and surrounding the shaft; and
a flywheel coupled to and surrounding the flywheel hub,
wherein each actuator assembly selectively engages and disengages the flywheel hub.

9. The system of claim 1, wherein each actuator assembly, when engaging the flywheel assembly, inhibits both rotational movement and translational movement of the flywheel assembly.

10. An energy storage flywheel system, comprising:
a housing assembly;
a flywheel assembly rotationally mounted in the housing assembly;
one or more magnetic bearing assemblies mounted in the housing assembly, each magnetic bearing assembly coupled to receive (i) an activation command, whereby the magnetic bearing assembly rotationally mounts the flywheel assembly in non-contact manner or (ii) an inactivation command, whereby the magnetic bearing assembly does not rotationally mount the flywheel assembly;
one or more actuator assemblies mounted in the housing assembly, each actuator assembly coupled to receive (i) an engage signal, whereby the actuator engages the flywheel assembly at least against rotational movement or (ii) a disengage signal, whereby the actuator disengages the flywheel assembly; and
an actuator assembly control circuit to (i) supply the engage signal to each actuator assembly at least when the inactivation command is supplied to the magnetic bearing assembly and (ii) supply the disengage signal to each actuator assembly at least when the activation command is supplied to the magnetic bearing assembly.

11. The system of claim 10, further comprising:
a magnetic bearing controller coupled to receive bearing command signals and operable, in response thereto, to supply at least the activation and deactivation signals to each of the magnetic bearings.

12. The system of claim 10, wherein each actuator assembly comprises:
a solenoid coupled to receive the engage and disengage signals from the actuator assembly control circuit and, in response thereto, to move m an engage and disengage direction, respectively; and
a lock mechanism coupled to the solenoid and (i) engaging the flywheel assembly when the solenoid moves in the engage direction and (ii) disengaging the flywheel assembly when the solenoid moves in the disengage direction.

13. The system of claim 12, wherein each solenoid is a latch solenoid.

14. The system of claim 10, further comprising:
one or more mechanical bearing assemblies mounted in the housing assembly, each mechanical bearing assembly coupled to the flywheel assembly to rotationally mount the flywheel assembly at least when each of the magnetic bearing assemblies is deactivated.

15. The system of claim 10, wherein the flywheel assembly comprises:
a shaft;
a flywheel hub coupled to and surrounding the shaft; and
a flywheel coupled to and surrounding the flywheel hub,
wherein each actuator assembly selectively engages and disengages the flywheel hub.

16. The system of claim 10, wherein each actuator assembly, when engaging the flywheel assembly, inhibits both rotational movement and translational movement of the flywheel assembly.

17. A method of selectively inhibiting rotation of a rotationally mounted flywheel assembly, wherein the flywheel assembly is rotationally mounted using one or more magnetic bearing assemblies that are each selectively activatable and deactivatable and, when activated, rotationally mount the flywheel assembly in non-contact manner, the method comprising the steps of:
engaging at least a portion of the flywheel assembly at least when each of the magnetic bearing assemblies is deactivated, to thereby substantially inhibit at least flywheel assembly rotational movement; and
disengaging the flywheel assembly at least when each of the magnetic bearing assemblies is activated, to thereby allow at least flywheel assembly rotational movement.

18. The method of claim 17, wherein the flywheel assembly movement that is substantially inhibited and allowed includes both rotational movement and translational movement.

* * * * *

UNITED STATES PATENT AND TRADEMARK OFFICE
CERTIFICATE OF CORRECTION

| | | |
|---|---|---|
| PATENT NO. | : 7,197,958 B2 | Page 1 of 1 |
| APPLICATION NO. | : 10/650267 | |
| DATED | : April 3, 2007 | |
| INVENTOR(S) | : Brault et al. | |

It is certified that error appears in the above-identified patent and that said Letters Patent is hereby corrected as shown below:

Column 7, line 45, "move m" should be changed to --move in--.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,197,958 B2 | Page 1 of 1 |
| APPLICATION NO. | : 10/650267 | |
| DATED | : April 3, 2007 | |
| INVENTOR(S) | : Brault et al. | |

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This inventionw was made with government support under Agreement No. F29601-01-2-0046 awarded by the U.S. Air Force, Air Force Research Laboratory. The government has certain rights in this invention.--

Signed and Sealed this

Eighteenth Day of September, 2007

JON W. DUDAS
*Director of the United States Patent and Trademark Office*